T. W. WHEATLEY.
BRAKE CONTROLLING DASHPOT.
APPLICATION FILED SEPT. 15, 1921.
1,419,430. Patented June 13, 1922.
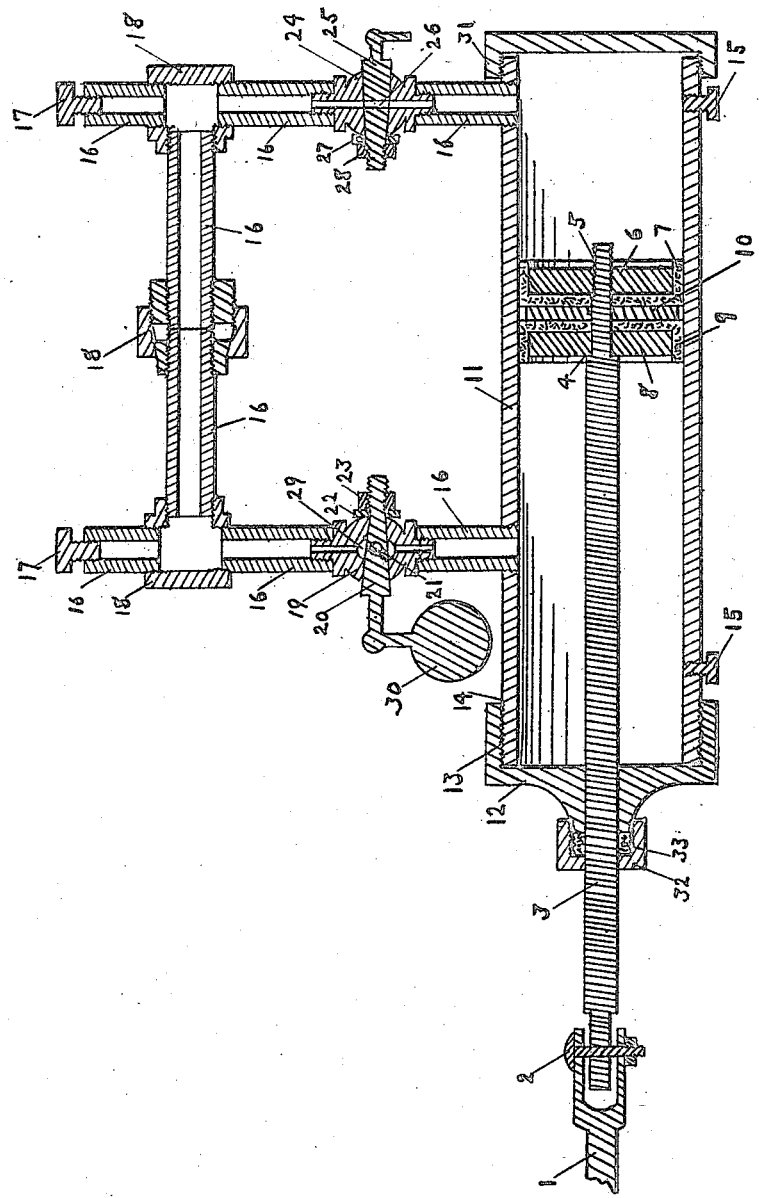
Inventor
Thos. W. Wheatley
By Beale Park
Attorney

UNITED STATES PATENT OFFICE.

THOMAS W. WHEATLEY, OF SHICKSHINNY, PENNSYLVANIA.

BRAKE-CONTROLLING DASHPOT.

1,419,430.   Specification of Letters Patent.   Patented June 13, 1922.

Application filed September 15, 1921. Serial No. 500,851.

*To all whom it may concern:*

Be it known that I, THOMAS W. WHEATLEY, a citizen of the United States, residing at Shickshinny, in the county of Luzerne and State of Pennsylvania, have invented certain new and useful Improvements in Brake-Controlling Dashpots; and I hereby declare that the following is a full, clear, and exact description thereof, reference being had to the accompanying drawings, which form part of the specification.

My invention relates to brake controlled dash-pots.

My object is to provide a simple mechanism which may be easily attached to any automobile or other vehicle adapted to be operated with a minimum number of parts contained in a dust proof casing.

Another object is to prevent the sudden binding of brakes by providing a resilient force by means of valves controlling gas, air or liquid.

Still another object is to have a self contained means for regulating the speed of automobiles and the like, independent of the power required to drive said vehicle.

In the accompanying drawing the figure shows the parts of my device in cross section.

Referring more particularly to the drawings 1 denotes a rod for attachment to an eccentric or other brake operating means not shown. 2 shows a bolt for connecting said rod to a piston rod 3 provided with a shoulder 4 and thread 5 for engagement with a solid disk 6 adapted to fit snugly inside of a fibrous cup washer 7. Another solid disk 8 and another cup washer 9 are also placed on the piston rod. The cup washers 7 and 9 are held apart by a solid disk 10. All said disks and washers being held in rigid relation between shoulder 4 of the piston rod and disk 6 screwed thereon. The above mentioned piston rod together with the disks and washers operate snugly within a cylinder 11. The cylinder is provided with a cylinder head 12 having an internal thread 13 adapted to engage an external thread 14 provided on the exterior of the cylinder. Plugs 15 are provided at the bottom of the cylinder for ease of cleaning same. A series of pipes 16 and fittings are attached to the cylinder. On the top of the pipes are plugs 17 adapted to be removed when it is desired to fill the cylinder with gas or liquid. Conventional couplings 18 are used for ease in assembling. 19 represents valve body containing a stop cock valve 20 provided with a pass 21 a washer 22 and a nut 23. Another valve body 24 containing a stop cock valve 25 provided with a pass 26 a washer 27 and a nut 28. In the seat of the valve body 19 I have provided a leakage pass or annular groove 29 which is formed in the valve seat and connects with the pipes 16. To the stop cock valve 20 is connected a handle provided with a weight 30. On the far end of cylinder 17 is screwed a back cylinder cap 31. In connection with the cylinder head 12 is a stuffing box 32 and packing 33.

It will be seen that when the stop cocks are open that the piston rod and plunger operate freely in the cylinder. When it is necessary to suddenly retard the speed of the vehicle the pet cock 20 aided by the weight 30 is turned down, the liquid or gas which has previously passed freely through the valve and around the annular pass 29 is confined to the annular or leakage pass. It will be seen that the leakage pass being of limited capacity allows but a small quantity of liquid or gas to pass therethrough thus retarding the motion of the piston and elastically braking the automobile or vehicle to which it is attached. To lock the brake in any desired position, stop cock 25 is turned, thus stopping entirely the flow of liquid or gas and holding the piston in equilibrium between the two bodies of liquid.

It will be seen from the foregoing that my device consists of a cylinder containing a snugly fitted piston, a cylinder and pipe connection fitted with fluid, gas or air, designed to check by means of an eccentric or other braking means not shown, the turning of a shaft or wheel and to apply such pressure in varying degrees, thus avoiding sudden clamping of brakes and dragging of wheels when applied to an automobile or the like.

It will be further seen that by using a viscous liquid, gas or air the resistance offered prevents a sudden movement of the brake to which the piston is attached.

Having described my invention, what I claim is:—

1. A brake controlling mechanism embracing a dash pot having a piston rod connection adapted to operate a brake, a cylinder in which said piston rod operates, a plunger consisting of three solid disks and two fibrous disks attached to said rod and slidable in said cylinder, pipe connections entering said cylinder at two points, a valve body containing a circumferential groove connecting with said piping, a stop cock provided with a weighted handle adapted to fit in said valve body, a second valve body provided with a stop cock and means for filling and cleaning said cylinder.

2. A brake controlling mechanism embracing a dash pot having a piston rod connection adapted to operate a brake, a cylinder in which said piston rod operates, a plunger consisting of three solid disks and two fibrous disks attached to said rod and slidable in said cylinder, pipe connections entering said cylinder at two points, a valve body containing a circumferential groove connecting with said piping, a stop cock provided with a weighted handle adapted to fit in said valve body and a second valve body provided with a stop cock.

3. In combination with a dash pot brake controlling mechanism, a gas or fluid chamber, a piston operating therein, a pipe line, a valve located in said pipe line, a circumferential groove in the seat of the body of said valve, a second valve located in said pipe line, said valves adapted to regulate the flow of gas or liquid therethrough for controlling the speed of said piston.

4. A brake controlling mechanism consisting of a cylinder equipped with a suitable piston and piston rod adapted for attachment to a brake operating means and a pressure supply pipe system consisting of twin pipes positioned in parallel relation opening into said cylinder and each provided with a stop cock one of which is equipped with a leakage pass and a control handle, said twin pipes being connected by a pipe positioned intermediate of the pressure supply and said stop cocks.

In testimony that I claim the foregoing as my own, I affix my signature.

THOMAS W. WHEATLEY.